United States Patent [19]

Roehr et al.

[11] Patent Number: 5,571,272
[45] Date of Patent: Nov. 5, 1996

[54] SEED BOX LID REPLACEMENT LATCH

[76] Inventors: Norman E. Roehr, Box 40, Rte. 1, Kismet, Kans. 67859; Stanley R. Reiss, Box 10, Rte. 1, Plains, Kans. 67869

[21] Appl. No.: 326,836

[22] Filed: Oct. 21, 1994

[51] Int. Cl.[6] ................................................. E05C 19/06
[52] U.S. Cl. .............................. 292/80; 292/84; 292/67; 292/10
[58] Field of Search ................................... 292/6, 10, 19, 292/20, 63, 67, 80, 83, 84; 220/306, 324; 24/457, 287, 563

[56] References Cited

U.S. PATENT DOCUMENTS

| | | |
|---|---|---|
| 1,035,666 | 8/1912 | Walpuski et al. . |
| 1,675,286 | 6/1928 | Valkenburg ................................ 24/563 |
| 1,844,053 | 2/1932 | Beatty . |
| 1,901,581 | 3/1933 | Chamberlain .......................... 220/324 |
| 2,134,585 | 10/1938 | Seghers ................................... 220/324 |
| 2,485,189 | 10/1949 | Churchill .................................. 292/80 |
| 2,760,674 | 8/1956 | Karp ......................................... 24/457 |
| 3,420,399 | 6/1969 | Heisler ..................................... 220/324 |
| 3,494,649 | 2/1970 | Malmstom ................................ 292/80 |
| 4,119,239 | 10/1978 | Anderson ................................ 220/324 |
| 4,520,925 | 6/1985 | Johnson ................................... 220/324 |
| 4,938,513 | 7/1990 | Gunderson ............................... 292/80 |
| 5,050,762 | 9/1991 | Giorgi ...................................... 220/281 |
| 5,123,541 | 6/1992 | Giannini ................................... 220/80 |

FOREIGN PATENT DOCUMENTS

| | | | |
|---|---|---|---|
| 2224301 | 2/1990 | United Kingdom ................... 220/324 |

*Primary Examiner*—Lloyd A. Gall
*Assistant Examiner*—Gary Estremsky
*Attorney, Agent, or Firm*—Jacobson, Price, Holman & Stern, PLLC

[57] ABSTRACT

A metal replacement latch associated with a plastic closure lid provided for the open upper end of a seed box on a seed planter. The replacement latch includes a metal bracket formed into U-shaped or V-shaped configuration having a pair of legs closely associated with and in engagement with the inner and outer surface of a depending flange provided on the plastic closure lid. The bracket is secured in place by fastening devices and includes an upwardly inclined projection on the upper edge of the inner leg of the bracket which extends toward the seed box to engage a downturned plastic flange on the upper end of a seed box to releasably retain the closure lid of the seed box in closed position. The metal latch replaces a plastic latch provided as original equipment on planter in which flexing of the plastic latch results in breakage of the latch which then requires replacement of the entire closure lid.

2 Claims, 1 Drawing Sheet

SEED BOX LID REPLACEMENT LATCH

BACKGROUND OF THE INVENTION

1. Field of the Invention

The present invention generally relates to improvements in seed boxes mounted on seed planters and more particularly to a metal replacement latch associated with a plastic closure lid provided for the open upper end of a seed box. The replacement latch includes a metal bracket formed into U-shaped or V-shaped configuration having a pair of legs closely associated with and in engagement with the inner and outer surface of a depending plastic flange provided on the closure lid with the bracket being secured in place by fastening devices and including an upwardly inclined projection on the upper end of the inner leg of the bracket which extends toward the seed box to engage a downturned flange on the upper end of a seed box to releasably retain the closure lid of the seed box in closed position. The metal latch replaces a plastic latch provided as original equipment on seed planters in which flexing of the plastic latch that is unitary with the plastic closure lid results in breakage of the plastic latch which then requires replacement of the entire plastic closure lid.

2. Description of the Prior Art

Planters of various types are provided with seed boxes which contain a supply of seed that is properly dispensed by various mechanisms into seed beds. The seed box or boxes normally are provided with a closure lid, usually pivotal or swingable, which are retained in closed position by some type of latch mechanism to protect the seed within the box and to enable the closure lid to move to an open position for replenishing the supply of seed in the seed box. Recent developments in planter seed boxes include the use of plastic seed boxes and plastic closure lids with the seed box including an outwardly and downwardly turned flange or lip at the upper end thereof and the lid including a downwardly extending peripheral flange which overlaps and telescopes over the flange or lip on the seed box. The lower edge of the flange on the closure lid is provided with an inwardly extending projection that is also of plastic material and of unitary or monolithic construction with the flange on the plastic lid. The inwardly extending plastic latch flexes or bends when the closure lid is moved between open and closed positions which results in breakage of the latch. When the latch breaks, sometimes after a short period of use, it is then necessary to replace the entire plastic lid which involves a considerable cost and delays are sometimes encountered in obtaining a replacement lid. In some instances, resilient straps, bands or cords have been used to hold the lid in closed position rather than obtain a replacement lid. However, such procedures are usually makeshift and require considerable time in placing them in position or removing them to enable the closure lid to be opened and are not entirely successful in maintaining the closure lid in closed position.

Various type of containers have been provided with closure lids with various latch mechanisms retaining the closure lids in place. The following U.S. patents relate generally to the provision of containers with closure lids with some type of latch mechanism.

U.S. Pat. No. 1,035,666
U.S. Pat. No. 1,844,053
U.S. Pat. No. 3,494,649
U.S. Pat. No. 4,938,513
U.S. Pat. No. 5,050,762

While seed planters with seed boxes having a closure lid and a latch mechanism are well known and containers with closure lids with some type of mechanism to retain them in closed position are well known, there is no disclosure in the prior art of a replacement latch constructed in accordance with the present invention and no replacement latch that is associated with a plastic closure lid and plastic seed box in accordance with this invention.

SUMMARY OF THE INVENTION

An object of the present invention is to provide a latch for the closure lid of a planter seed box to facilitate movement of the closure lid between closed and open positions with the latch being a one-piece spring metal component attached to a projecting flange on the closure lid for secure detachable engagement with a portion of the upper end of the seed box.

Another object of the invention is to provide a replacement latch for an existing plastic latch that is unitarily constructed with a plastic closure lid for a seed box on a seed planter thereby eliminating the necessity of replacing the entire plastic closure lid when the existing plastic latch breaks or otherwise becomes inoperative.

A further object of the invention is to provide a metal replacement latch for an existing plastic latch provided on plastic closure lids for planter seed boxes in which the existing plastic latches are subject to breakage resulting from flexing and bending which occurs when the closure lid is moved between closed and open positions.

Still another object of the invention is to provide a metal replacement latch in accordance with the preceding objects in which the latch is of one-piece metal construction formed into a U-shaped or V-shaped configuration with adjacent legs being positioned against and secured to the inner and outer surfaces of a depending flange on a plastic closure lid for a plastic seed box on a planter with the latch including an inclined projection or tab for secure but detachable engagement with an outwardly and downwardly extending flange on the open upper end of the seed box.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 3:
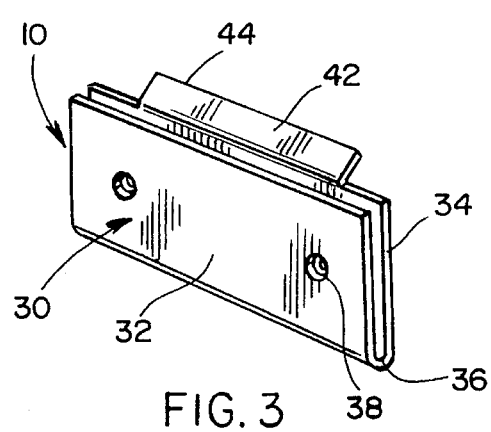
FIG. 3 is a perspective view of the metal replacement latch for the seed box lid.

The replacement latch of the present invention is generally designated by reference numeral 10 and is illustrated in FIG. 3. The latch 10 is associated with a plastic closure lid 12 for a plastic seed box 14 to releasably retain the lid 12 in closed relation to the seed box 14 to enable the lid 12 to be moved to an open position and releasably retained in closed position so that seed within the seed box is protected from inclement weather conditions and the like. As illustrated, the seed box 14 includes a peripheral wall 16 with a reversely curved, outwardly and downwardly extending peripheral flange 18 around the open upper end thereof. The seed box 14 is constructed of plastic material and is of a size to receive a desired quantity of seed.

Figure 2:
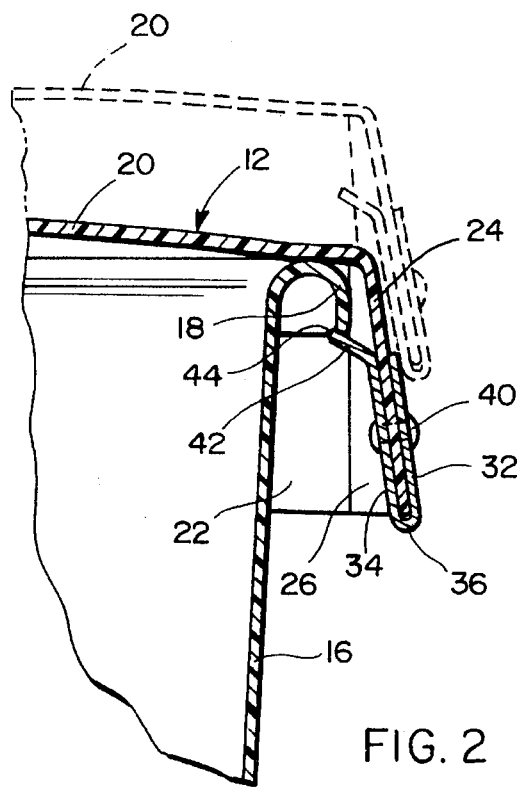
FIG. 2 is a vertical, sectional view, on an enlarged scale, taken substantially upon a plane passing along section line 2—2 on FIG. 1 illustrating the specific structure of the metal latch of the present invention and its association with the existing plastic closure lid and plastic seed box.

The lid 12 includes a panel 20 of plastic material provided with a downwardly extending and slightly outwardly flared flange 22 which telescopes over and extends downwardly beyond the flange 18 on the upper end of the planter box 14 as illustrated in FIG. 2. The flange 22 includes an outwardly offset, centrally located flange portion 24 which is outwardly inclined to a greater extent with the offset portion being connected to the flange 22 by short vertical walls 26. The lower edge of the offset flange portion 24 is normally provided with a plastic latch which engages the flange 18 on the seed box to hold the lid 12 in closed position. The plastic latch normally provided on the lower edge of the offset flange portion 24 is of unitary construction with the remainder of the plastic lid and is prone to breakage after a relatively short number of opening and closing cycles of the closure lid. Since the normally provided plastic latch is integral with or unitary with the lid, when the latch is broken, it is then necessary to replace the entire plastic lid 12 which entails considerable expense and also may involve a delay in obtaining a replacement closure lid.

Figure 1:
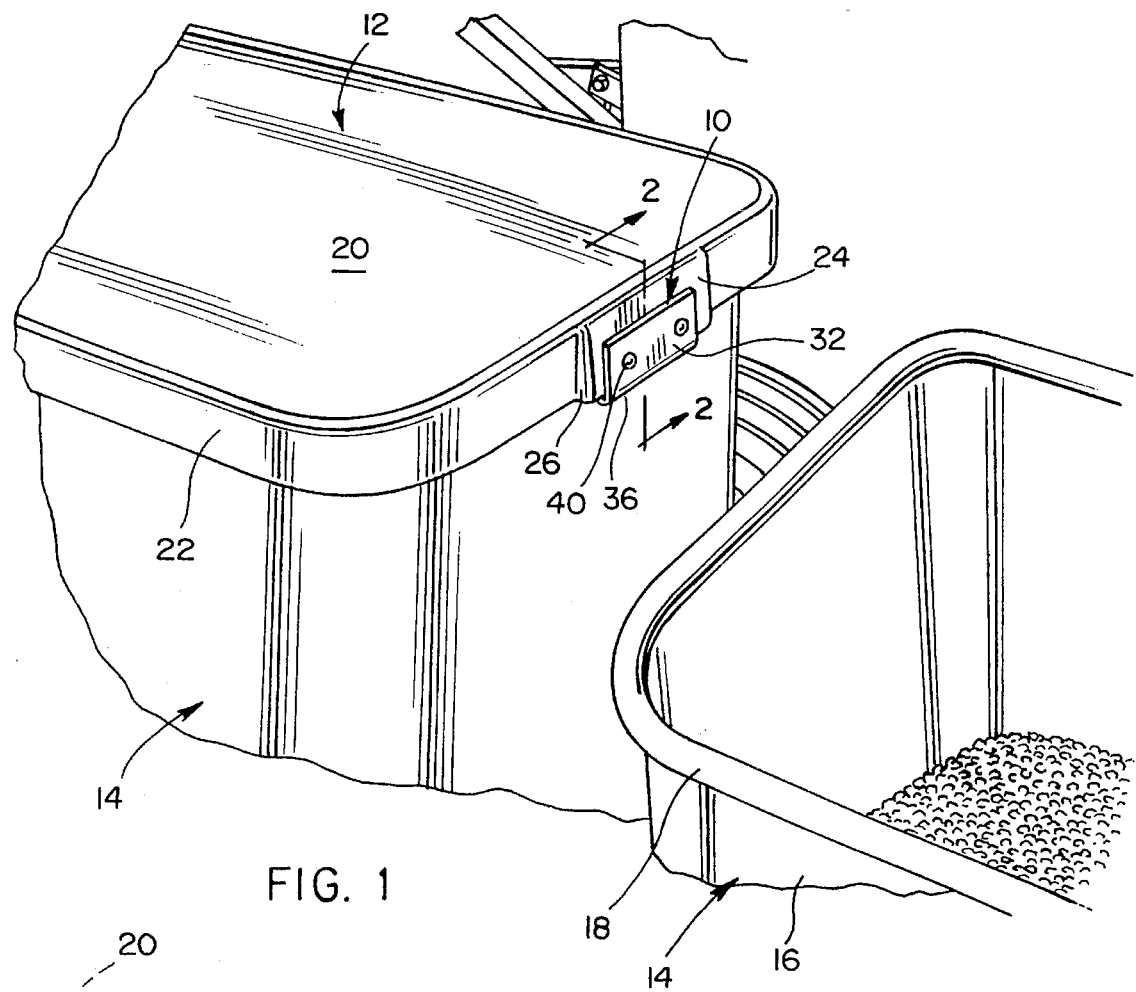
FIG. 1 is a perspective view of a planter seed box and plastic closure lid with the replacement bracket of the present invention installed thereon.

The replacement bracket 10 of the present invention is illustrated in FIG. 3 and includes a generally U-shaped metal bracket designated by reference numeral 30 and which includes an outer flange or leg 32 and an inner flange or leg 34 which are interconnected by a reverse bend or bight portion 36 with the distance between the legs 32 and 34 being generally equal to the thickness of the offset flange portion 24 as illustrated in FIG. 1 so that the bracket 30 can be slid vertically upwardly onto the bottom edge of the offset flange portion 24 as illustrated in FIG. 2. The legs 32 and 34 have apertures 38 extending therethrough with the apertures in the legs 32 and 34 being aligned and receiving fastening devices in the form of bolts, rivets or the like designated by reference numeral 40 which also extend through apertures in the offset flange portion 24 as illustrated in FIG. 2. The apertures are formed in the plastic offset flange portion 24 by sliding the latch 10 upwardly onto the offset flange portion 24 and using the holes 38 in the legs 32 and 34 as a guide for forming holes in the plastic offset flange portion 24. Thus, in attaching the replacement latch 10, it is only necessary to slide it upwardly into position, use the holes 38 as a guide to drill holes through the plastic offset flange portion 24 and insert the fastening nut and bolt arrangements or any other fastening arrangement to be used.

The upper edge of the inner leg or flange 34 of the spring metal bracket 30 is provided with a projection or tab 42 which extends along a major portion of the length of the upper edge of the leg 34 and is inclined upwardly toward the seed box 14 and projects away from the plane of the inner leg 34 as illustrated in FIGS. 2 and 3. The free edge 44 of the projection 42 snaps inwardly under the bottom edge of the flange 18 on the seed box 14 when the lid 12 is moved to closed position as illustrated in FIG. 2 thereby securely retaining the lid in closed position. The resiliency of the flange 18 and the offset flange portion 24 enables the offset flange portion 24 to be flexed outwardly sufficiently to move the free upper edge 44 of the bracket 30 to move outwardly from under flange 18 to enable the lid 12 to be pivoted to open position for replenishing the supply of seed in the seed box 14. The resiliency of projection or tab 42 enables it to flex when pressure is applied thereto during movement of the lid 12 between open and closed position thereby forming a secure releasable replacement latch 10 for the lid 12.

The replacement latch 10 may be constructed of 16–18 gauge metal having a width of 3 ¼ inch and a length of 2 ⅝ inches folded along the lengthwise center and provided with two ¼ inch holes that will be oriented closer to the top edges of the folded metal than to the folded edge thereof. The latch projection 42 is in the form of a tab or flange that extends 2 inches along the edge of leg 34 and ⅜ inch from the edge of leg 34. The fasteners may be ¼ inch diameter by ½ inch length bolts to securely hold the replacement metal latch in place on the normally provided offset plastic lid flange portion 24 and effectively secures the lid in closed position but enables it to be easily moved to open position. The dimensional characteristics of the replacement latch 10 may vary depending on the installational requirements. The replacement latch 10 will have a very long life span and capable of effectively functioning to hold the plastic lid releasably in closed position. The use of the replacement latch 10 eliminates the costly replacement of the plastic lid 12 and eliminates delays encountered in obtaining a replacement plastic lid and will effectively retain the closure lid in closed position but yet enable it to be quickly and easily moved to an open position in order to fill the seed box 14 with seed grain.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination with a planter seed box having an open top defined by an outwardly and downwardly extending peripheral lip, a pivotal one-piece closure lid mounted for movement between open and closed positions relative to said seed box, said lid including a depending peripheral flange telescoped over the lip on the seed box when the lid is in closed position, said lid being constructed of plastic material to enable the flange on the lid to flex outwardly during movement of the lid between open and closed position, a latch mounted on said flange, said latch including a U-shaped bracket telescopically receiving a lower edge portion of said flange and oriented adjacent the seed box when the lid is in closed position and a projection mounted on said bracket and extending upwardly and inwardly toward said lip on the seed box to a position underlying said lip when the lid is in closed position, the lower edge portion of said flange on the lid and said projection being flexed laterally away from the seed box to release said projection from the lip to enable the lid to move to open position, said projection being constructed of spring metal to enable resilient snap engagement of the projection into underlying relation to said lip during movement of the lid toward closed position, said U-shaped bracket including two adjacent legs closely receiving said flange on the closure lid therebetween, fastening means extending through the legs and through the flange on the closure lid, said projection on the bracket extending along a major portion of the length of an end edge of one leg of said U-shaped bracket and including a free edge engaging a bottom edge of said lip on the seed box.

2. The method of replacing a plastic latch which has broken from a depending peripheral flange on the hinged plastic lid of a plastic planter seed box having an open upper end defined by an outwardly and downwardly extending lip normally engaged by the plastic latch on the peripheral flange on the plastic lid, said method comprising the steps of forming a one-piece metal bracket into a U-shaped configuration having a pair of closely spaced legs with one of the legs having an inclined flange at its upper edge which inclines away from the other leg of said bracket, telescoping the legs of the bracket onto the flange on the lid with the flange on the U-shaped bracket being positioned inwardly of the flange on the lid and engaging a bottom edge on said lip on the seed box, and fastening the legs of the bracket to the lid flange by fastener devices extending through the legs and lid flange, engaging the flange on the leg of the bracket with an outer surface of the lip on the seed box when the lid is closed to cam the bracket and lower portion of the lid flange outwardly to enable the free edge of the flange on the bracket to move downwardly below the lip on the seed box and extend into underlying relation to the lip on the seed box when the closure lid has moved to closed position, and flexing the flange on the closure lid and the bracket outwardly to move the free edge of the flange on the bracket laterally outwardly from under the bottom edge of the lip on the seed box to enable the closure lid to move to open position.

\* \* \* \* \*